US012803637B2

(12) United States Patent
Lee et al.

(10) Patent No.: US 12,803,637 B2
(45) Date of Patent: Nov. 17, 2026

(54) MACHINE LEARNING-BASED CHANNEL STATE INFORMATION (CSI) REPORTING

(71) Applicant: QUALCOMM Incorporated, San Diego, CA (US)

(72) Inventors: Hyojin Lee, San Diego, CA (US); Chenxi Hao, Beijing (CN); June Namgoong, San Diego, CA (US); Taesang Yoo, San Diego, CA (US); Wei Xi, Beijing (CN); Pavan Kumar Vitthaladevuni, San Diego, CA (US); Yu Zhang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/692,763

(22) PCT Filed: Nov. 4, 2021

(86) PCT No.: PCT/CN2021/128619
§ 371 (c)(1),
(2) Date: Mar. 15, 2024

(87) PCT Pub. No.: WO2023/077349
PCT Pub. Date: May 11, 2023

(65) Prior Publication Data

US 2024/0380465 A1 Nov. 14, 2024

(51) Int. Cl.
*H04W 72/04* (2023.01)
*H04B 7/0456* (2017.01)
(Continued)

(52) U.S. Cl.
CPC ......... *H04B 7/0632* (2013.01); *H04B 7/0486* (2013.01); *H04B 7/0626* (2013.01); *H04B 17/346* (2023.05)

(58) Field of Classification Search
CPC .. H04B 7/0632; H04B 7/0486; H04B 7/0626; H04B 7/0417; H04B 7/063; H04B 7/0636; H04B 17/346
See application file for complete search history.

(56) References Cited

U.S. PATENT DOCUMENTS

| | | | | |
|---|---|---|---|---|
| 9,294,310 B2 * | 3/2016 | Wu | H04B 7/0689 | |
| 2012/0300867 A1 * | 11/2012 | Chen | H04B 7/0456 | 375/267 |

(Continued)

FOREIGN PATENT DOCUMENTS

| | | |
|---|---|---|
| CN | 111416642 A | 7/2020 |
| WO | 2017219268 A1 | 12/2017 |
| WO | 2020213964 A1 | 10/2020 |

OTHER PUBLICATIONS

Supplementary European Search Report—EP21962866—Search Authority—Munich—Aug. 19, 2025.

(Continued)

*Primary Examiner* — Mahbubul Bar Chowdhury
(74) *Attorney, Agent, or Firm* — Qualcomm Incorporated/Seyfarth Shaw LLP

(57) ABSTRACT

A method of wireless communication by a user equipment (UE), includes estimating a downlink channel to generate a channel estimate. The method also includes obtaining multiple precoding matrices, by a channel state information (CSI) module including a neural network encoder decoder pair, based on the channel estimate and multiple different multiple input multiple output (MIMO) ranks. The method further includes determining a best rank indicator based on the precoding matrices and spectral efficiency estimates for the different MIMO ranks. The method still further includes reporting, to a base station, the best rank indicator, a channel quality index (CQI), and CSI encoder output.

24 Claims, 12 Drawing Sheets

(51) Int. Cl.

| | |
|---|---|
| ***H04B 7/06*** | (2006.01) |
| ***H04B 17/309*** | (2015.01) |

(56) References Cited

U.S. PATENT DOCUMENTS

| | | | | |
|---|---|---|---|---|
| 2015/0304010 | A1* | 10/2015 | Zhang | H04L 5/005 370/329 |
| 2015/0381249 | A1* | 12/2015 | Zhang | H04B 7/0691 375/267 |
| 2020/0235795 | A1 | 7/2020 | Hwang et al. | |
| 2021/0266763 | A1 | 8/2021 | Yoo et al. | |
| 2021/0273706 | A1 | 9/2021 | Zeng et al. | |
| 2021/0273707 | A1 | 9/2021 | Yoo et al. | |
| 2021/0314036 | A1 | 10/2021 | Baknina et al. | |
| 2021/0351885 | A1* | 11/2021 | Chavva | G06N 3/04 |
| 2022/0124744 | A1* | 4/2022 | Shen | H04L 1/06 |
| 2023/0353283 | A1* | 11/2023 | Tian | H04L 1/0026 |
| 2024/0259072 | A1* | 8/2024 | Liu | H04B 7/0626 |
| 2025/0105945 | A1* | 3/2025 | Shimoda | H04L 1/0072 |

OTHER PUBLICATIONS

International Search Report and Written Opinion—PCT/CN2021/128619—ISA/EPO—Jul. 8, 2022.

OPPO: "Discussion on R18 Study on AI/ML-Based 5G Enhancements", 3GPP TSG RAN Meeting #93-e, RP-211809, Sep. 17, 2021 (Sep. 17, 2021), 23 Pages, The Whole Document.

Supplementary European Search Report—EP21962866—Search Authority—Munich—Jun. 2, 2025.

* cited by examiner

MACHINE LEARNING-BASED CHANNEL STATE INFORMATION (CSI) REPORTING

FIELD OF THE DISCLOSURE

The present disclosure relates generally to wireless communications, and more specifically to channel state information (CSI) reporting for machine learning (ML)-based precoding feedback.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE) includes estimating a downlink channel to generate a channel estimate. The method also includes obtaining multiple precoding matrices, by a channel state information (CSI) module including a neural network encoder decoder pair, based on the channel estimate and multiple different multiple input multiple output (MIMO) ranks. The method further includes determining a best rank indicator based on the precoding matrices and spectral efficiency estimates for the different MIMO ranks. The method still further includes reporting, to a base station, the best rank indicator, a channel quality index (CQI), and CSI encoder output.

In other aspects of the present disclosure, a method of wireless communication by a base station includes receiving, from a user equipment (UE), channel state information (CSI) encoder output generated by a CSI module. The CSI module includes a neural network encoder decoder pair, based on a predetermined rank. The method also includes receiving signal strength values for each of the multiple input multiple output (MIMO) layers. The signal strength values are based upon multiple precoding matrices generated by the CSI module. The method further includes determining a transmission rank and modulation and coding scheme (MCS) based on the signal strength values and the CSI encoder output.

Other aspects of the present disclosure are directed to an apparatus for wireless communication by a user equipment (UE) having a memory and one or more processor(s) coupled to the memory. The processor(s) is configured to estimate a downlink channel to generate a channel estimate. The processor(s) is also configured to obtain multiple precoding matrices, by a channel state information (CSI) module including a neural network encoder decoder pair, based on the channel estimate and multiple different multiple input multiple output (MIMO) ranks. The processor(s) is further configured to determine a best rank indicator based on the precoding matrices and spectral efficiency estimates for the different MIMO ranks. The processor(s) is still further configured to report, to a base station, the best rank indicator, a channel quality index (CQI), and CSI encoder output.

Other aspects of the present disclosure are directed to an apparatus by a base station, having a memory and one or more processor(s) coupled to the memory. The processor(s) is configured to receive, from a user equipment (UE), channel state information (CSI) encoder output generated by a CSI module. The CSI module includes a neural network encoder decoder pair, based on a predetermined rank. The processor(s) is also configured to receive signal strength values for each of multiple MIMO layers. The signal strength values are based upon multiple precoding matrices generated by the CSI module. The processor(s) is further configured to determine a transmission rank and modulation and coding scheme (MCS) based on the signal strength values and the CSI encoder output.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
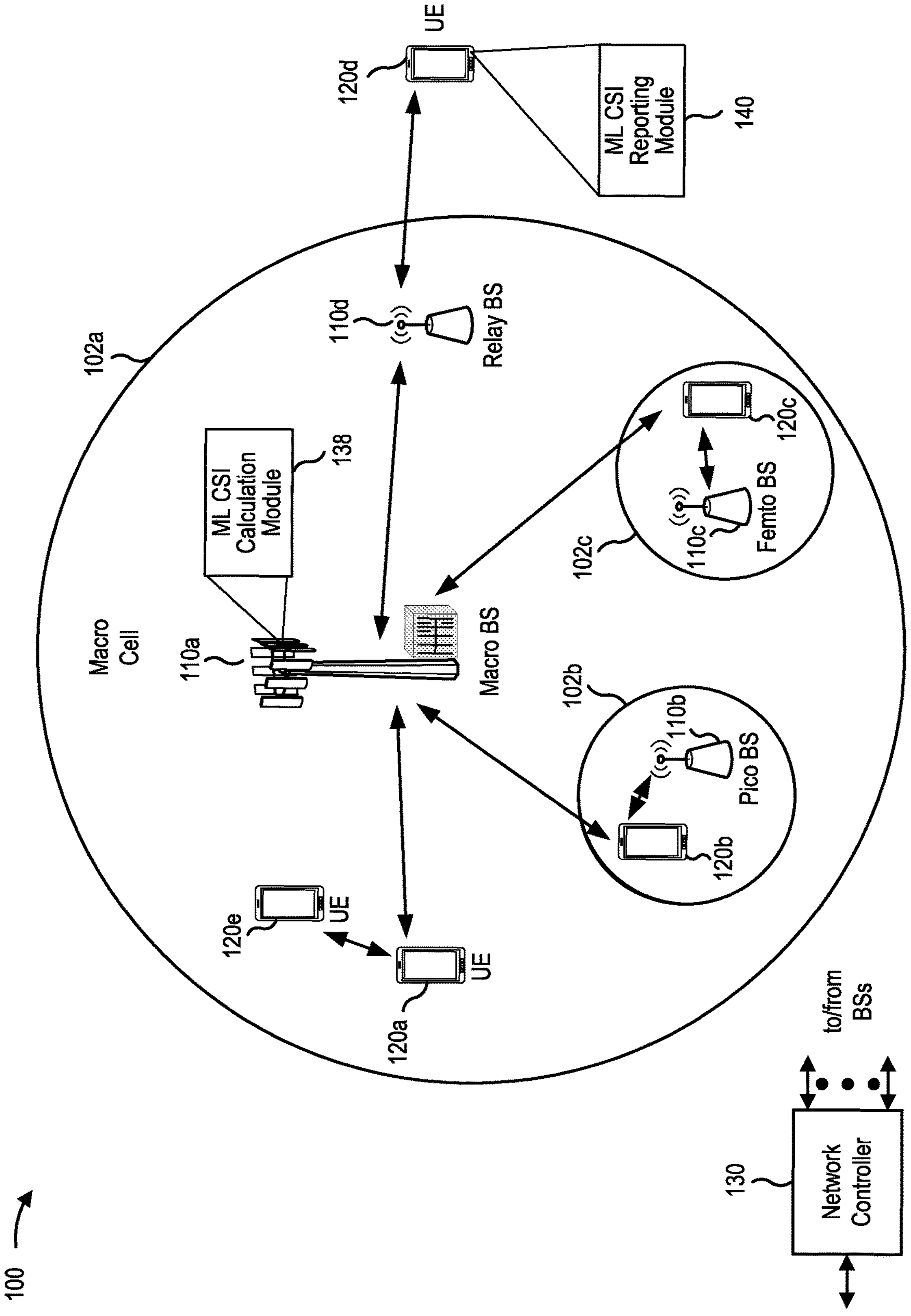
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as “elements”). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Link adaptation allows a transmitter to adjust data transmission based on channel conditions experienced by the receiver. To apprise the transmitter of these channel conditions, channel state information (CSI) is provided from the user equipment (UE) to the base station. Channel state information may include information such as a rank indicator (RI), a precoding matrix indicator (PMI), and a channel quality indicator (CQI).

The UE reports a precoding matrix indicator (PMI) for multiple input, multiple output (MIMO) transmissions when multiple antennas are present at the base station. The precoding matrix maps symbols from each transmission layer to antenna ports of the base station and is based on a number of transmission layers (e.g., streams) associated with a rank indication (RI). The CQI assists the base station with selecting an appropriate modulation and coding scheme (MCS) for downlink transmissions. Current wireless standards, such as new radio (NR) specifications, support a codebook-based feedback scheme where a UE calculates an RI, a PMI, and a CQI based on a precoder codebook. The precoder codebook is specified for a given antenna configuration and channel environment.

A trend in wireless communications is for the base station to have a larger number of transmit antennas to exploit more beamforming and multi-user MIMO gains. CSI feedback schemes utilizing machine-learning (ML) may provide better performance than legacy codebook-based feedback schemes, especially when a large number of antennas are used for downlink transmission. Additionally, when machine learning is used for precoding matrix feedback, base station beamforming is customized for different UE types and environments so that various vertical use cases may be efficiently supported in wireless networks. Aspects of the present disclosure are directed to improving machine learning-based channel state feedback (CSF).

More specifically, aspects of the present disclosure relate to defining a rank indicator (RI) and channel quality indicator (CQI) when a precoding matrix is calculated by the UE, and also when an RI and CQI are calculated and reported by the UE. Other aspects relate to a base station determining a transmission rank and MCS when the UE does not report the RI and CQI.

In some aspects of the present disclosure, a per-rank CSI encoder/decoder pair (CSI module) is defined for determining and reporting RI and CQI. In these aspects, the UE has a set of channel state information modules. That is, for each rank, there is a separate CSI module. The best rank indicator is determined after comparing spectral efficiency estimations from each of the per-rank CSI modules. A CSI reporting module of the UE reports the best rank indicator and the corresponding CSI encoder output to the base station. The CSI encoder output is from the CSI module corresponding to the best rank.

In other aspects of the present disclosure, a single CSI module receives the RI as input. In these aspects, the UE has a single CSI module that receives the RI as an input. Similar to the case with per-rank CSI-modules, the UE calculates the best rank indicator. With a single CSI module, however, the UE calculates the best rank indicator after comparing spectral efficiency estimates for different rank hypotheses. The UE reports the best rank indicator and the corresponding CSI encoder output to the base station.

With both the single CSI module and the per-rank CSI modules, the CQI calculation and reporting are conditioned on the RI and the CSI decoder output. After receiving the CSI, the base station CSI decoder generates a precoding matrix based on the RI and CSI encoder output.

In cases where the UE does not report the RI and CQI, according to aspects of the present disclosure, the base station may determine the RI and CQI (and corresponding MCS). In these aspects, the UE calculates and reports CSI encoder output assuming a maximum rank (R). The UE also reports per-layer signal strength values after applying the precoding matrix, $\hat{V}$, output from the channel decoder. The signal strength values may be signal to interference plus noise ratio (SINR) values.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B, an access point, a transmit and receive point (TRP), and/or the like. Each BS may provide communications coverage for a particular geographic area. In 3GPP, the term “cell” can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms “eNB,” “base station,” “NR BS,” “gNB,” “AP,” “node B,” “5G NB,” “TRP,” and “cell” may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a machine learning (ML) channel state information (CSI) reporting module 140. For brevity, only one UE 120*d* is shown as including the ML CSI reporting module 140. The ML CSI reporting module 140 may estimate a downlink channel to generate a channel estimate. The ML CSI reporting module 140 may also obtain multiple precoding matrices based on the channel estimate and multiple different multiple input multiple output (MIMO) ranks. The ML CSI reporting module 140 may further determine a best rank indicator based on the precoding matrices and spectral efficiency estimates for the different MIMO ranks. The ML CSI reporting module 140 may still further report, to a base station, the best rank indicator, a channel quality index (CQI), and CSI encoder output.

The base stations 110 may include a machine learning (ML) channel state information (CSI) calculation module 138. For brevity, only one base station 110*a* is shown as including the ML CSI calculation module 138. The ML CSI calculation module 138 may receive, from a user equipment (UE), channel state information (CSI) encoder output generated by a CSI module. The CSI module includes a neural network encoder decoder pair, based on a predetermined rank. The ML CSI calculation module 138 may also receive signal strength values for each of the multiple input multiple output (MIMO) layers. The signal strength values are based upon multiple precoding matrices generated by the CSI module. The ML CSI calculation module 138 may further determine a transmission rank and modulation and coding scheme (MCS) based on the signal strength values and the CSI encoder output.

As indicated above, FIG. 1 is provided merely as an example. Other examples may differ from what is described with regard to FIG. 1.

Figure 2:
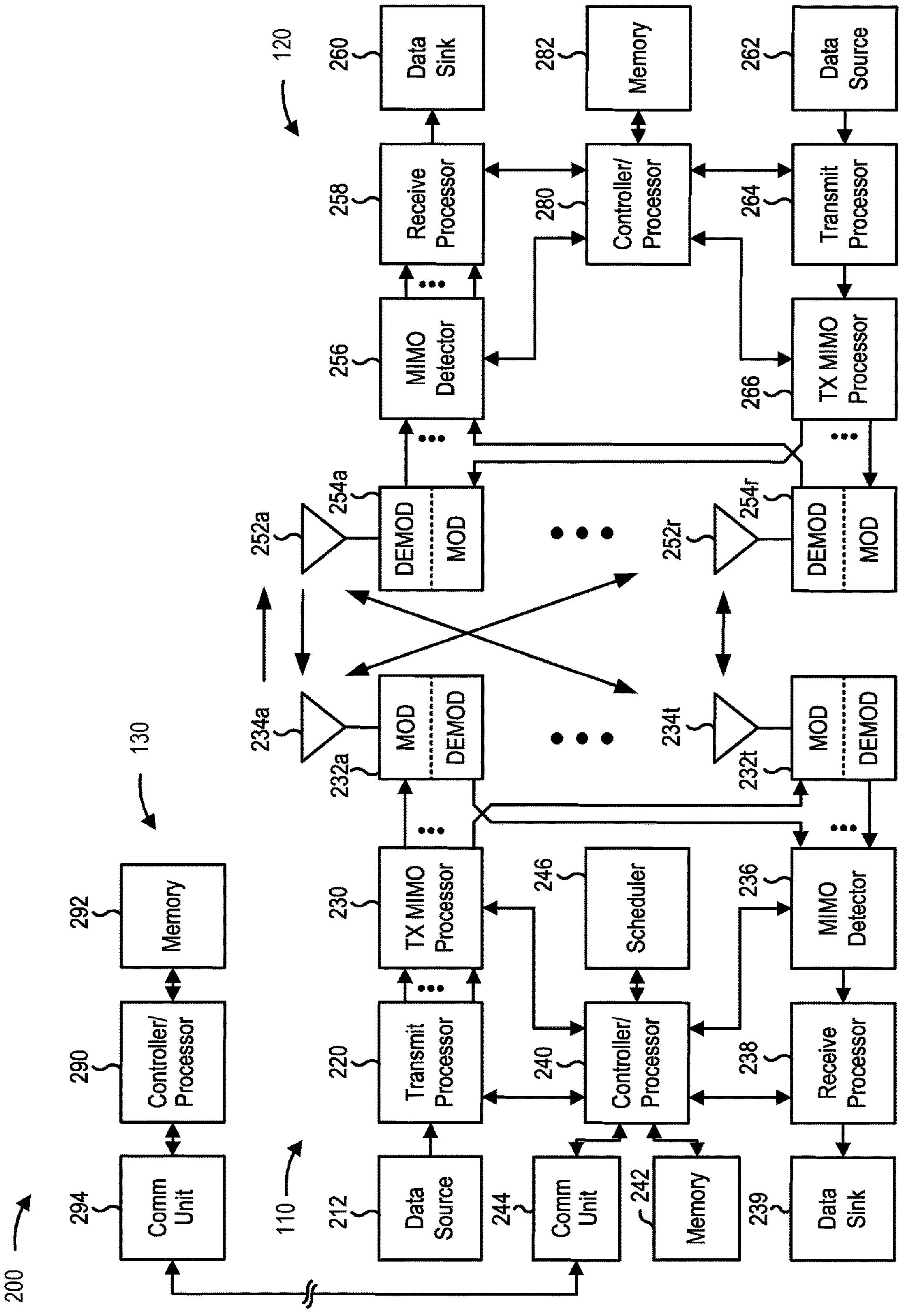
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general $T \geq 1$ and $R \geq 1$.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for channel state feedback as described in more detail elsewhere. For example, the controller/processor 240 of the base station 110, the controller/processor 280 of the UE 120, and/or any other component(s) of FIG. 2 may perform or direct operations of, for example, the processes of FIGS. 11 and 12 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for estimating, means for obtaining, means for determining, means for reporting, means for receiving, and/or means for calculating. In some aspects, the base station 110 may include means for receiving, and/or means for determining. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
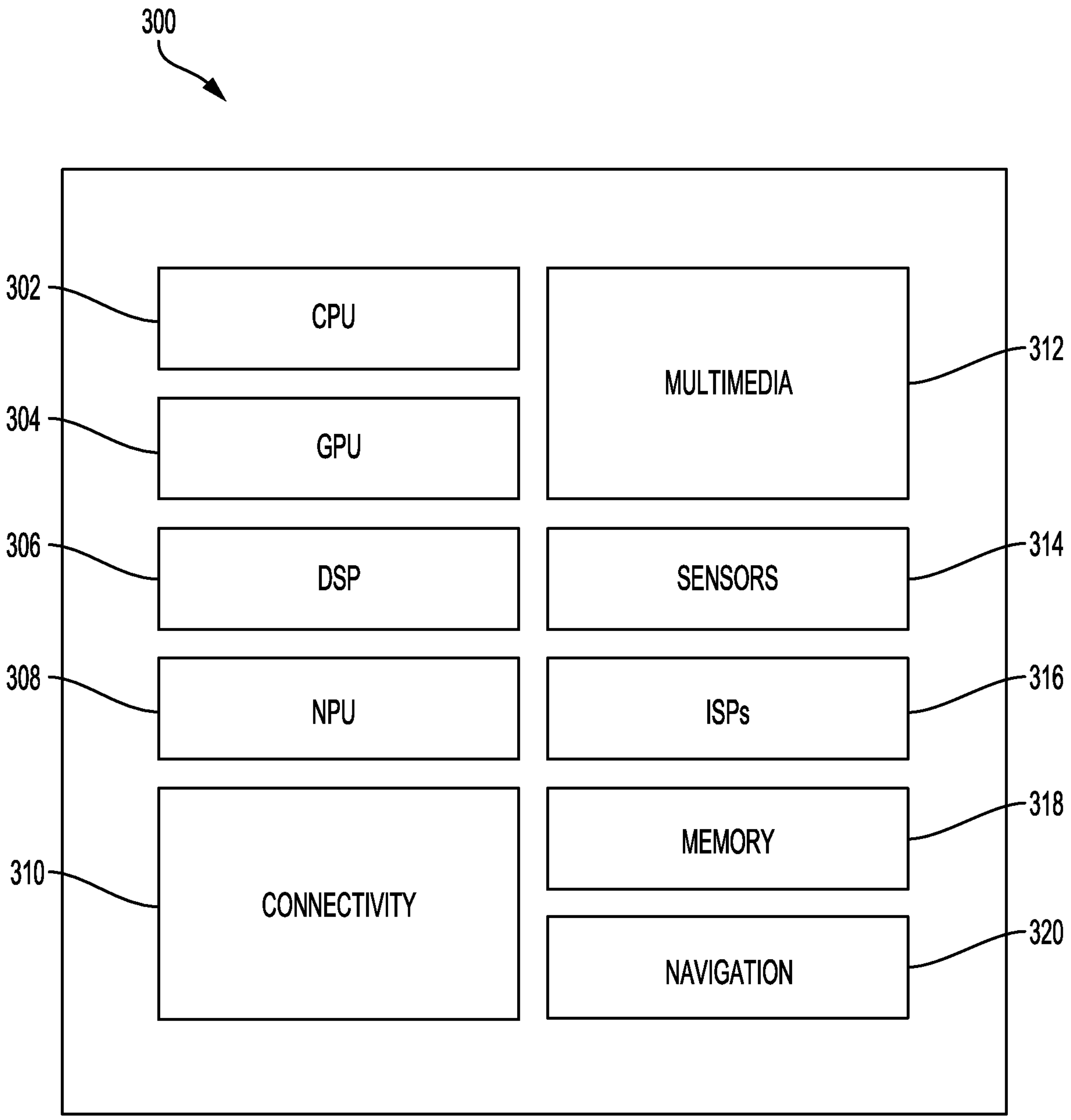
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
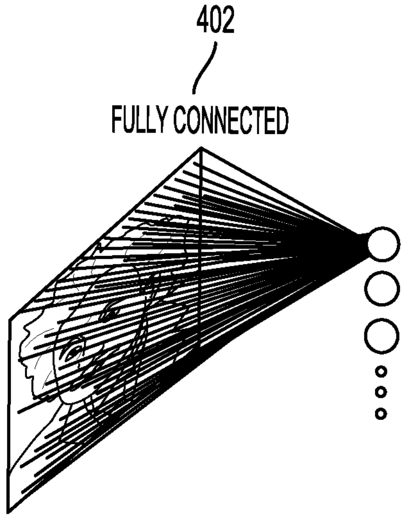
FIGS. 4A, 4B, and 4C are diagrams illustrating a neural network, in accordance with aspects of the present disclosure.
Figure 4B:
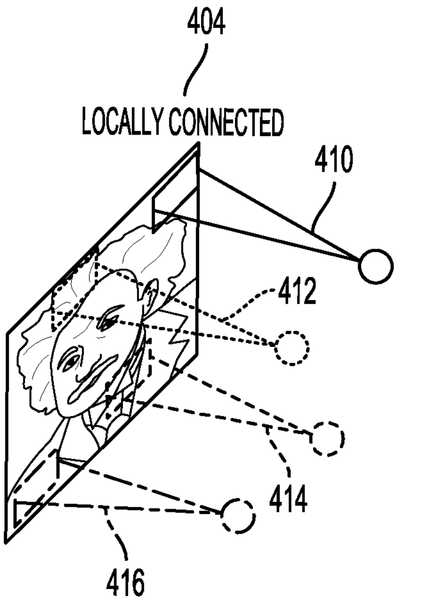

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
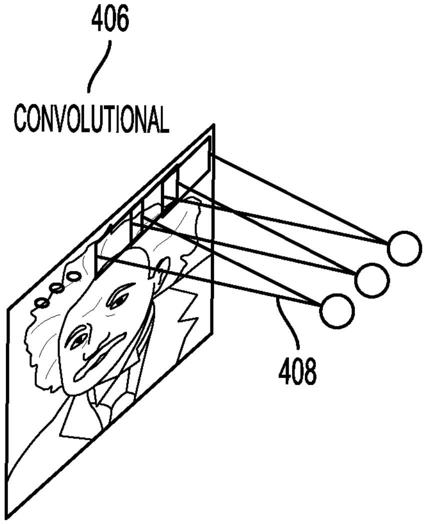

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
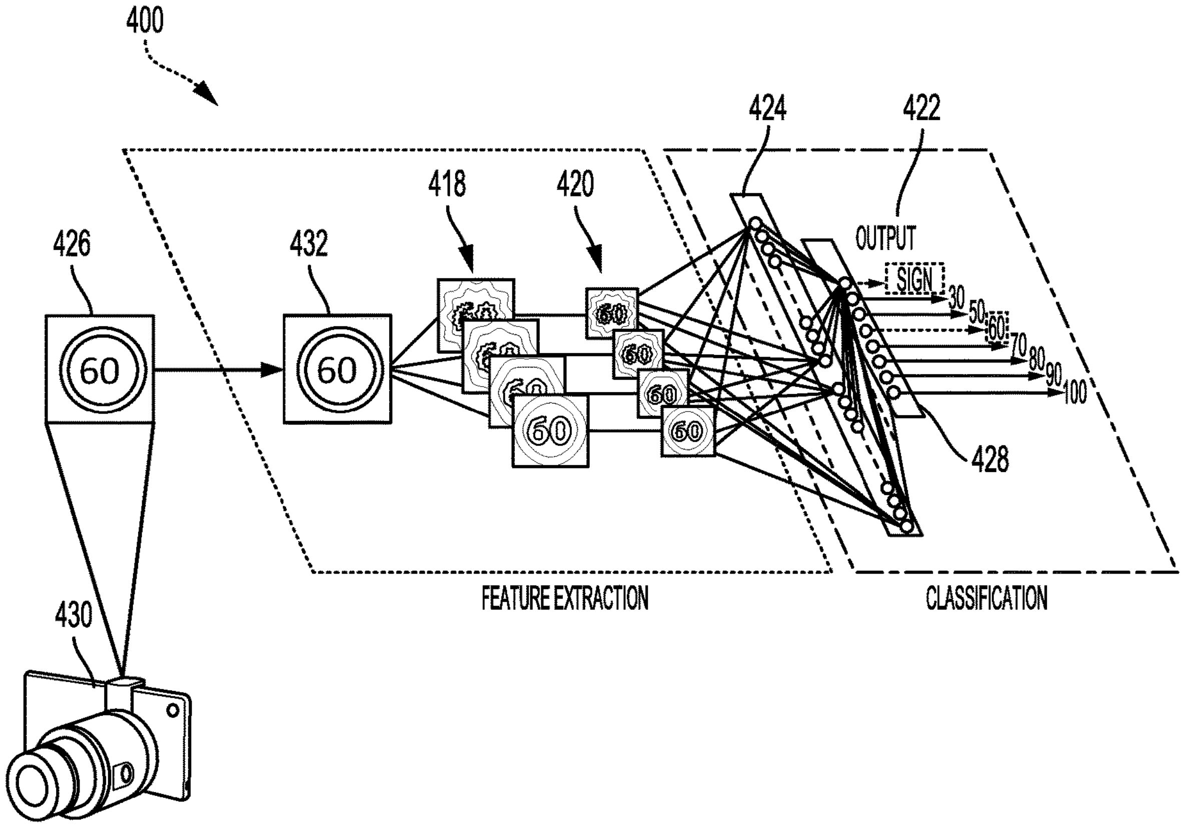
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
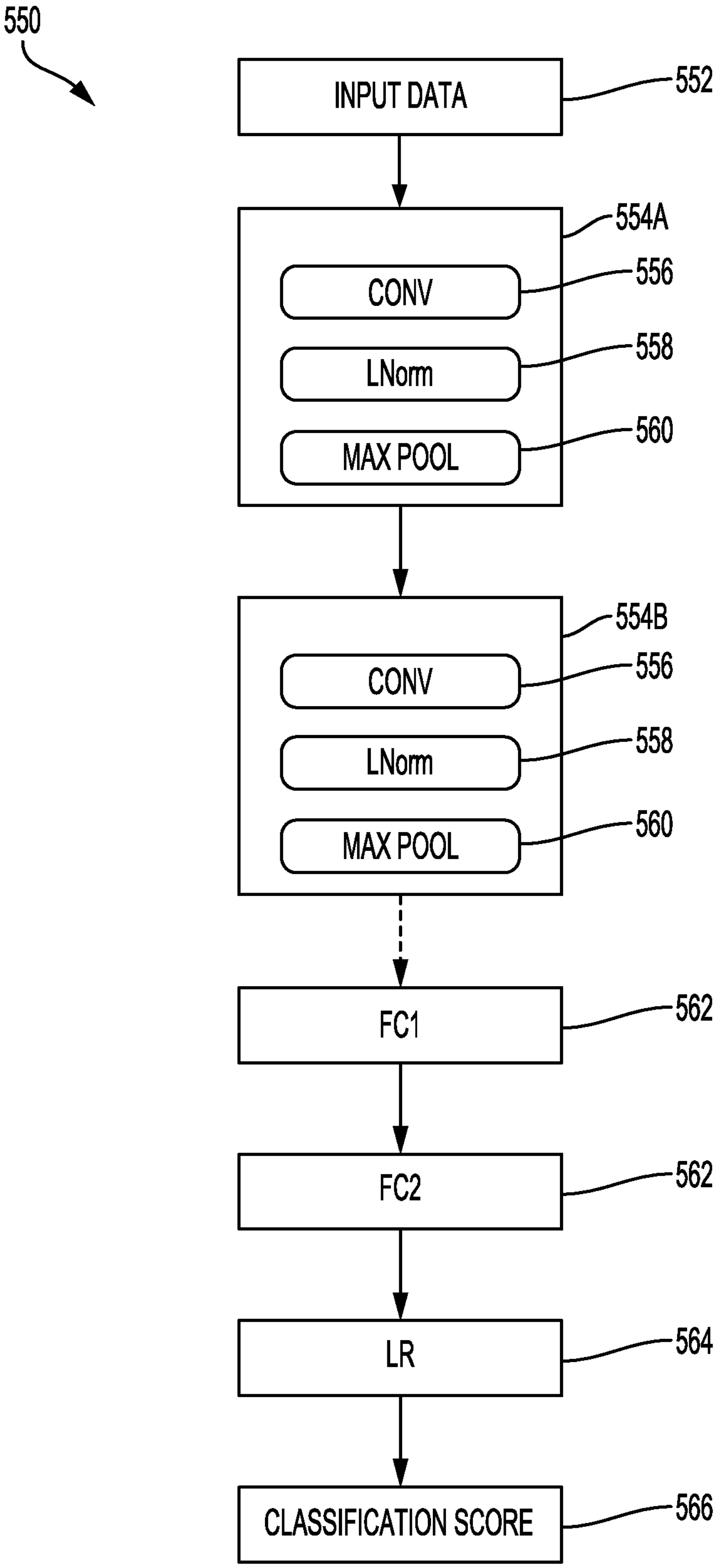
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Link adaptation allows a transmitter to adjust data transmission based on channel conditions experienced by the receiver. To apprise the transmitter of these channel conditions, channel state information (CSI) is provided from the UE to the base station. Channel state information may include information such as a rank indicator (RI), a precoding matrix indicator (PMI), and a channel quality indicator (CQI).

The UE reports a precoding matrix indicator (PMI) for multiple input, multiple output (MIMO) transmissions when multiple antennas are present at the base station. The PMI specifies a precoding matrix that may be used for downlink transmission. The precoding matrix maps symbols from each transmission layer to antenna ports of the base station and is based on a number of transmission layers (e.g., streams) associated with a rank indication (RI). The MIMO rank is the number of transmission layers the UE suggests for downlink transmissions to the UE. The CQI assists the base station with selecting an appropriate modulation and coding scheme (MCS) for downlink transmissions. The CQI is generated based on measurements of downlink reference signals. Current wireless standards, such as new radio (NR) specifications, support a codebook-based feedback scheme where a UE calculates an RI, a PMI, and a CQI based on a precoder codebook. The precoder codebook is specified for a given antenna configuration and channel environment.

A trend in wireless communications is for the base station to have a larger number of transmit antennas to exploit more beamforming and multi-user MIMO gains. CSI feedback schemes utilizing machine-learning (IL) may provide better performance than legacy codebook-based feedback schemes, especially when a large number of antennas are used for downlink transmission. Additionally, when machine learning is used for precoding matrix feedback, base station beamforming is customized for different UE types and environments so that various vertical use cases may be efficiently supported in wireless networks. Aspects of the present disclosure are directed to improving machine learning-based channel state feedback (CSF).

Figure 6:
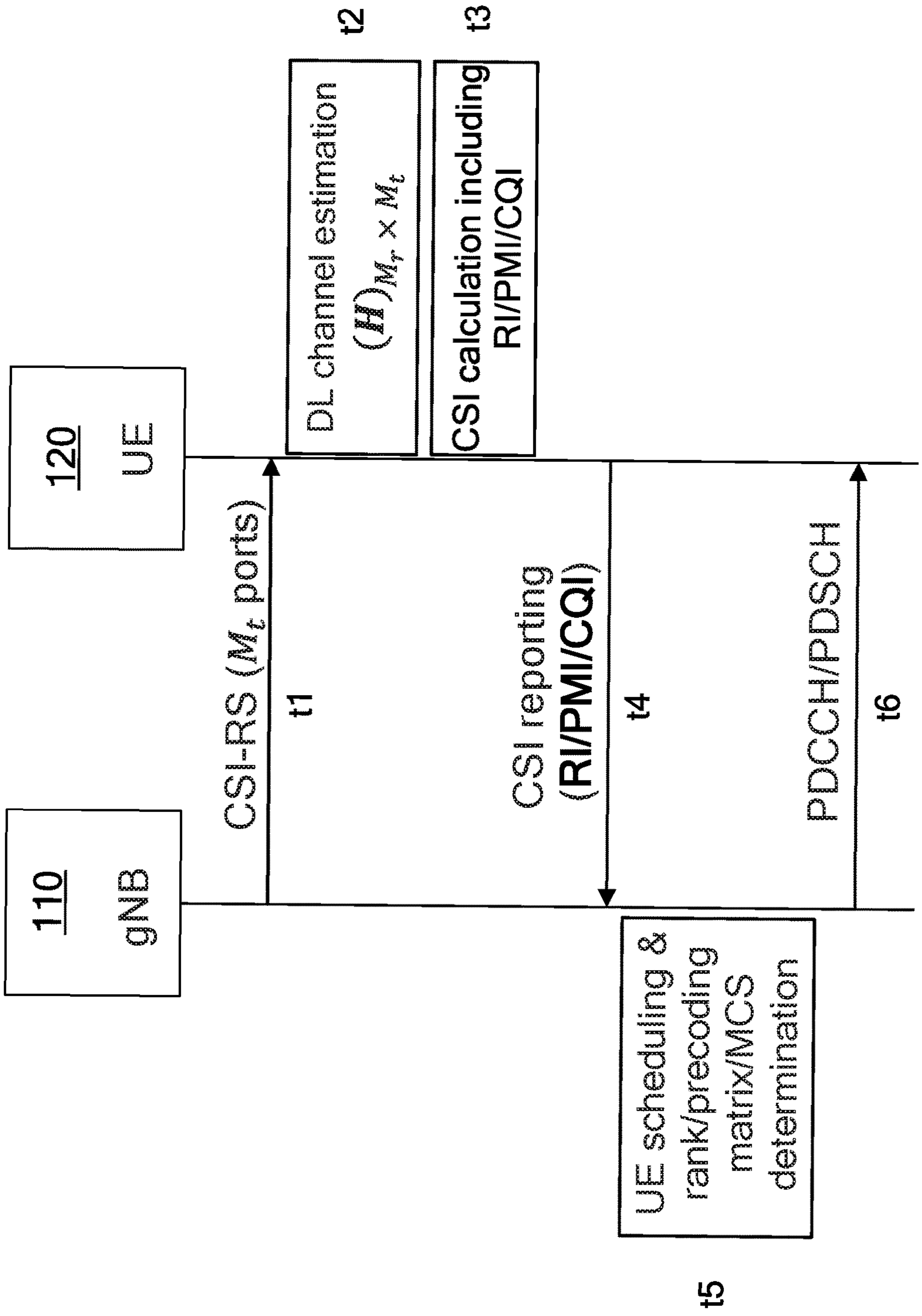
FIG. 6 is a call flow diagram illustrating an example link adaptation process performed, for example, by a user equipment (UE) and a base station.

A legacy link adaptation and channel state information (CSI) calculation for frequency division duplexed (FDD) communications is now described. FIG. 6 is a call flow diagram illustrating an example link adaptation process performed, for example, by a user equipment (UE) and a base station. In the example of FIG. 6, the base station (e.g., gNB) 110 transmits a channel state information-reference signal (CSI-RS) to the UE 120 at time t1. The transmission is via a number, $M_t$, of transmission antenna ports. At time t2, the UE 120 estimates the downlink (DL) channel H based on measurements of the CSI-RS. The channel H may be represented by an $M_r \times M_t$ downlink channel matrix, where $M_r$ is the number of receive antenna ports at the UE.

Based on the downlink channel H, at time t3, the UE 120 calculates the CSI, including the RI, PMI, and CQI. The UE 120 calculates the CSI based on a codebook from rank 1 to rank R: $\{\{P_1(0), \ldots, P_1(L_1-1)\}, \ldots, \{P_R(0), \ldots, P_R(L_R-1)\}\}$, where R is a minimum value of $M_r$ and $M_t$, P is the precoding matrix, and $L_r$ is the number of rank-r precoding matrices in the code book. The precoding and rank selection for a given codebook are based on equation (1)

$$(R*, i*) = \text{argmax}_{r,i} SE_{est}(H, P_r(i)), \tag{1}$$

where R* is the best rank indicator, i* is the best precoding matrix index (PMI) for the best precoder, $P_{R*}(i*)$, and $SE_{est}(H, P_r(i))$ is the spectral efficiency estimation when H and $P_r(i)$ are given. Calculation of the best CQI, CQI*, is conditioned on the best rank indicator R* and precoder i*in accordance with equation (2):

$$CQI^* = f(SE_{est}(H, P_{R^*(i^*)}). \tag{2}$$

After calculating the CSI, at time t4, the UE 120 reports the calculated CSI, including the suggested RI, PMI, and CQI, to the base station 110. Based on the received CSI, at time t5, the base station 110 schedules the UE 120 and determines the rank, precoding matrix, and MCS for downlink transmissions to the UE 120. At time t6, the base station 110 transmits a physical downlink control channel (PDCCH) and/or physical downlink shared channel (PDSCH) in accordance with the schedule, and the determined rank, precoding matrix, and MCS.

CSI feedback schemes utilizing machine-learning (ML) may provide better performance than legacy codebook-based feedback schemes, especially when a large number of antennas are used for downlink transmission. A general framework for machine learning-based precoding matrix feedback is now described.

Figure 7:
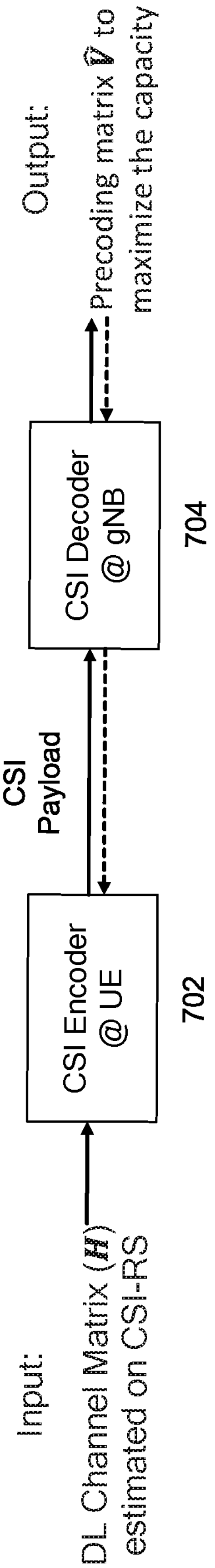
FIG. 7 is a block diagram illustrating an example machine learning channel state information (CSI) feedback system, in accordance with various aspects of the present disclosure.

FIG. 7 is a block diagram illustrating an example machine learning channel state information (CSI) feedback system, in accordance with various aspects of the present disclosure. In the example of FIG. 7, a CSI encoder 702 at a UE communicates channel state information feedback to a CSI decoder 704 at a base station. The CSI encoder 702 may be a neural network operating at the UE. The CSI decoder 704 may be a neural network running at the base station (e.g., gNB). The CSI encoder 702 receives as input a measurement of a received signal, such as a channel state information-reference signal (CSI-RS) received on CSI-RS resource elements (REs). In some configurations, the input of the CSI encoder 702 is a downlink channel matrix, H, estimated on the CSI-RS resources.

A feedback report associated with the channel is generated based on receiving the reference signal. The CSI encoder 702 may quantize a value associated with the feedback report and transmit the quantized value to the base station over the air as a CSI payload. The CSI decoder 704 receives the reported CSI payload as input. The CSI decoder 704 may process the one or more quantized values to estimate the channel between the base station and the UE. The CSI decoder 704 may also generate precoding information, such as a precoding matrix, $\hat{V}$, for MIMO transmissions when multiple antennas are present at the base station. The precoding matrix may be used for downlink transmission to optimize a metric, such as capacity, on the downlink. The metric may alternatively be a mean square error (MSE) between the precoding matrix and a singular value decomposition (SVD) precoding matrix, for example. The CSI encoder-decoder pair is designed and/or trained to jointly generate the precoding matrix that optimizes the given metric.

Knowledge of the CSI decoder 704 is available to the UE. For example, the precoding matrix, $\hat{V}$, or some other information about the CSI decoder 704 may be signaled from the base station to the UE as seen by the dashed lines. The signaling may be higher layer signaling, in some configurations. With this information, the UE is able to predict the CSI decoder output based on a given input downlink channel matrix, H.

Rank indicator (RI) and channel quality indicator (CQI) calculation should be defined when UE RI/CQI reporting occurs. Rank and modulation and coding scheme (MCS) should be determined by the base station when UE RI/CQI reporting is not defined.

Aspects of the present disclosure relate to defining a rank indicator (RI) and channel quality indicator (CQI) when a precoding matrix is calculated by the UE and an RI and CQI are calculated and reported by the UE. Other aspects relate to a base station determining a transmission rank and MCS when the UE does not report the RI and CQI.

Figure 8:
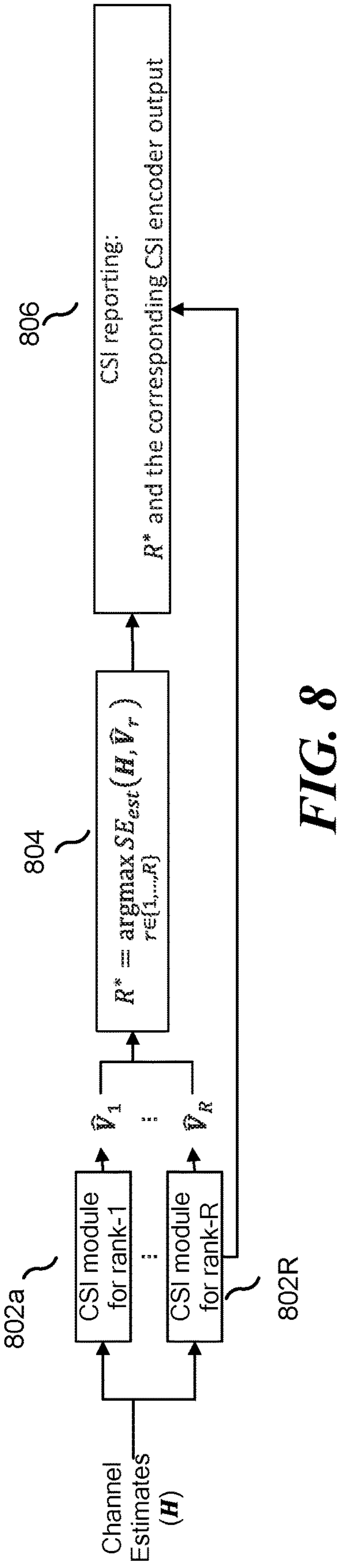
FIG. 8 is a block diagram illustrating an example CSI feedback system at a UE, including per-rank CSI modules, in accordance with various aspects of the present disclosure.

In some aspects of the present disclosure, a per-rank CSI encoder/decoder pair (CSI module) is defined for determining and reporting RI and CQI. FIG. 8 is a block diagram illustrating an example CSI feedback system at a UE, including per-rank CSI modules, in accordance with various aspects of the present disclosure. In the example of FIG. 8, the UE has a set of channel state information (CSI) modules 802*a* to 802R. For each rank, there is a separate CSI module 802*a* to 802R that receives the channel, H, as input. The best rank indicator, R*, is determined after comparing spectral efficiency estimations from each of the per-rank CSI modules 802*a* to 802R. More specifically, a module 804 calculates the best rank indicator, R*, in accordance with equation (3):

$$(R^*) = \text{argmax } SE_{est}(H, \hat{V}_r), \tag{3}$$

where $r \in \{1, \ldots, R\}$, and $\hat{V}_r$ represent the precoding matrix output from each of the per-rank CSI modules.

A CSI reporting module 806 of the UE reports the best rank indicator, R*, and the corresponding CSI encoder output to the base station. The CSI encoder output is from the CSI module 802*a* to 802R corresponding to the best rank. In the example of FIG. 8, the per-rank CSI decoder information is signaled to the UE.

Figure 9:
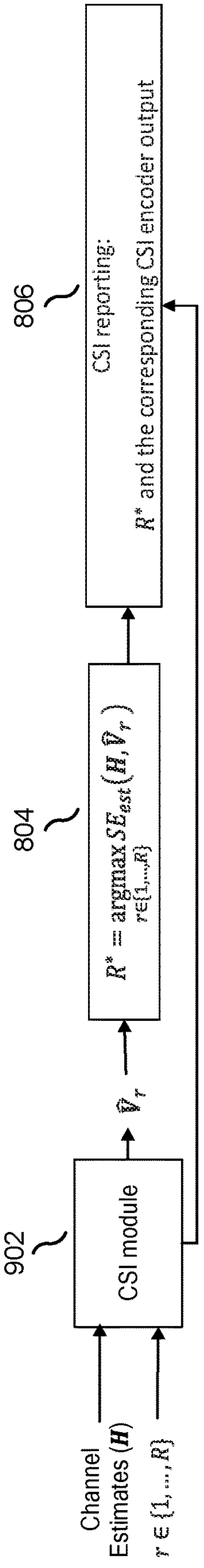
FIG. 9 is a block diagram illustrating an example CSI feedback system at a UE, including a single CSI module, in accordance with various aspects of the present disclosure.

In other aspects of the present disclosure, a single CSI module receives the RI as input. FIG. 9 is a block diagram illustrating an example CSI feedback system at a UE, including a single CSI module, in accordance with various aspects of the present disclosure. In the example of FIG. 9, the UE has a single CSI module 902 that takes RI and the channel, H, as input. Similar to the example described with respect to FIG. 8, the module 804 calculates the best rank indicator, R*, in accordance with equation (3). In the example of FIG. 9, however, the module 804 calculates the best rank indicator, R*, after comparing spectral efficiency estimates for different rank hypotheses. The CSI reporting module 806 of the UE reports the best rank indicator, R*, and the corresponding CSI encoder output to the base station.

With both the single CSI module 902 of FIG. 9 and the per-rank CSI modules 802*a* to 802R of FIG. 8, the CQI calculation and reporting is conditioned on RI (R*) and the CSI decoder output $\hat{V}_{R^*}$ in accordance with equation (4):

$$CQI^* = f(SE_{est}(H, \hat{V}_{R^*})). \tag{4}$$

After receiving the CSI, the base station CSI decoder generates a precoding matrix with the RI and CSI encoder output.

In cases where the UE does not report the RI and CQI, according to aspects of the present disclosure, the base station may determine the RI and CQI (and corresponding MCS). In these aspects, the UE calculates and reports CSI encoder output assuming a maximum rank (R). In some configurations, the maximum rank may be a minimum value of $M_r$ and $M_t$. In other configurations, the bases station configures the maximum rank.

In these aspects of the present disclosure, the UE reports per-layer signal strength values after applying the precoding matrix, $\hat{V}$, output from the channel decoder. The signal strength values may be signal to interference plus noise ratio (SINR) values ($SINR_1$, $SINR_2$, . . . , $SINR_R$). The SINR values may be calculated in accordance with equation (5), for example, when a linear minimum mean square error (LMMSE) receiver is used:

$$SINR_r = \frac{1}{\left[\left((H\hat{V})^{\dagger}(H\hat{V}) + I\right)^{-1}\right]_{rr}} - 1, \tag{5}$$

where I is the identity matrix, and rr represents the r-th diagonal component of the matrix.

Based on the reported per-layer SINR values, the base station may determine a final transmission rank and MCS for data transmission. If per-layer SINR values are available at the base station side, those values may also be useful for multi-user MIMO (MU-MIMO) scheduling. Even when the RI is calculated and reported by the UE as described with respect to FIGS. 8 and 9, per-layer SINR reporting may still be useful for base station multi-user scheduling.

Figure 10:
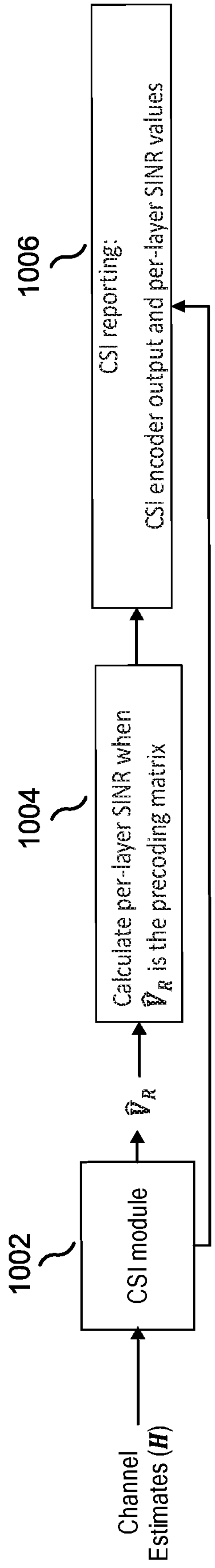
FIG. 10 is a block diagram illustrating an example CSI feedback system at a UE for per-layer signal to interference plus noise ratio (SINR) reporting, in accordance with various aspects of the present disclosure.

FIG. 10 is a block diagram illustrating an example CSI feedback system at a UE for per-layer signal to interference plus noise ratio (SINR) reporting, in accordance with various aspects of the present disclosure. In the example of FIG. 10, the UE reports the per-layer SINR values instead of the RI and CQI. A CSI module 1002 receives channel estimates, H, as input, and generates a precoding matrix $\hat{V}_R$ based on the maximum rank, R. A module 1004 of the UE calculates a per-layer SINR with $\hat{V}_R$ as the precoding matrix. A reporting module 1006 at the UE reports to the base station the CSI encoder output and the SINR values.

Figure 11:
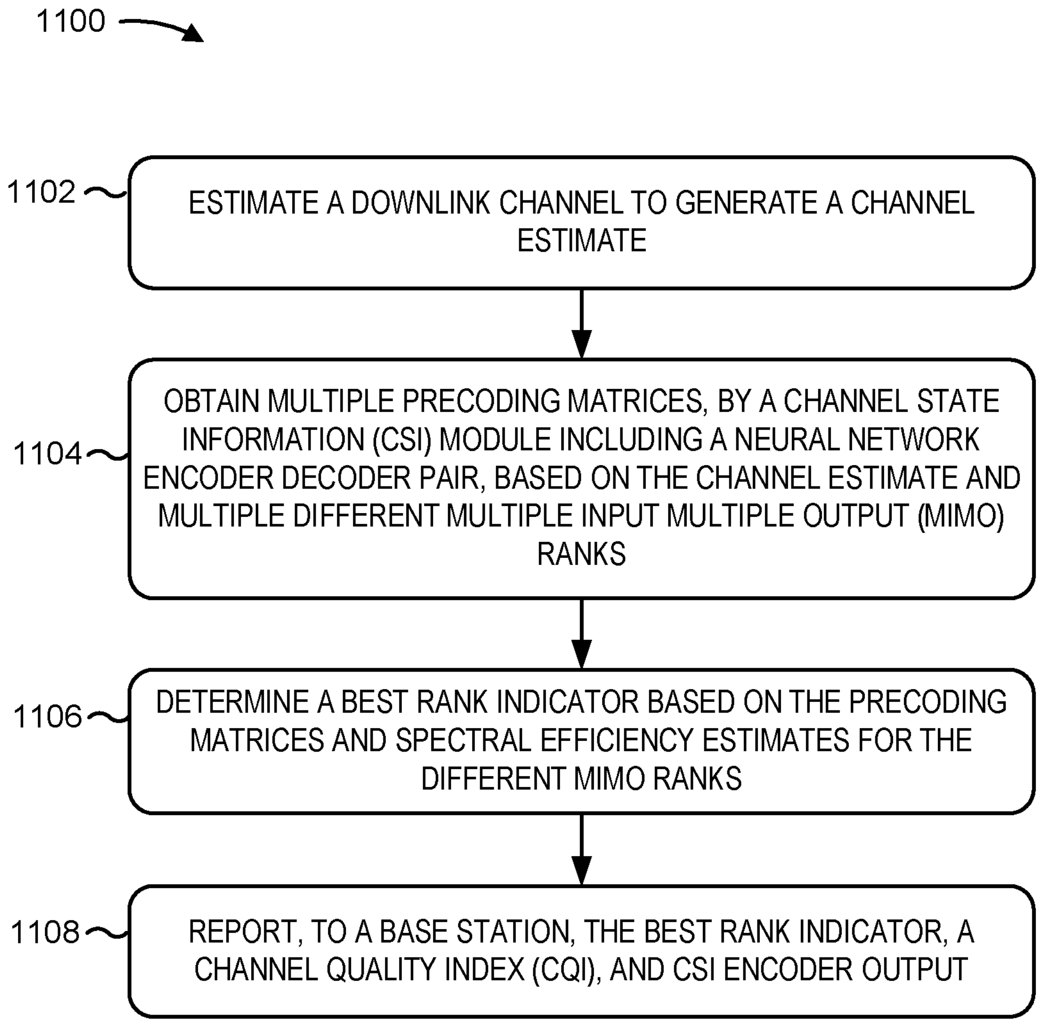
FIG. 11 is a flow diagram illustrating an example process performed, for example, by a user equipment (UE), in accordance with various aspects of the present disclosure.

FIG. 11 is a flow diagram illustrating an example process 1100 performed, for example, by a user equipment (UE), in accordance with various aspects of the present disclosure. The example process 1100 is an example of channel state information (CSI) reporting for machine learning (ML)-based precoding feedback. The operations of the process 1100 may be implemented by a UE 120.

At block 1102, the user equipment (UE) estimates a downlink channel to generate a channel estimate. For example, the UE (e.g. using the controller/processor 280, and/or memory 282) may estimate the downlink channel. The channel estimate models physical propagation characteristics of the downlink channel between the base station and the UE.

At block 1104, the user equipment (UE) obtains multiple precoding matrices, by a channel state information (CSI) module including a neural network encoder decoder pair, based on the channel estimate and a multiple of different multiple input multiple output (MIMO) ranks. For example, the UE (e.g. using the controller/processor 280, and/or memory 282) may obtain the precoding matrices. In some aspects, the CSI module comprises multiple CSI modules, each of the CSI modules corresponding to a different MIMO rank. In other aspects, the CSI module is a single module that receives multiple potential rank indicators as input.

At block 1106, the user equipment (UE) determines a best rank indicator based on the plurality of precoding matrices and spectral efficiency estimates for the plurality of different MIMO ranks. For example, the UE (e.g. using the controller/processor 280, and/or memory 282) may determine the best rank indicator. The UE may also calculate the CQI based on the best rank indicator and the plurality of precoding matrices. The UE receives, from the base station, signaling of CSI decoder information of the neural network encoder decoder pair to enable the determination of the best rank indicator.

At block 1108, the user equipment (UE) reports, to a base station, the best rank indicator, a channel quality index (CQI), and CSI encoder output. For example, the UE (e.g. using the antenna 252, DEMOD/MOD 254, TX MIMO processor 266, transmit processor 264, controller/processor 280, and/or memory 282) may report the best rank indicator, the CQI, and CSI encoder output.

Figure 12:
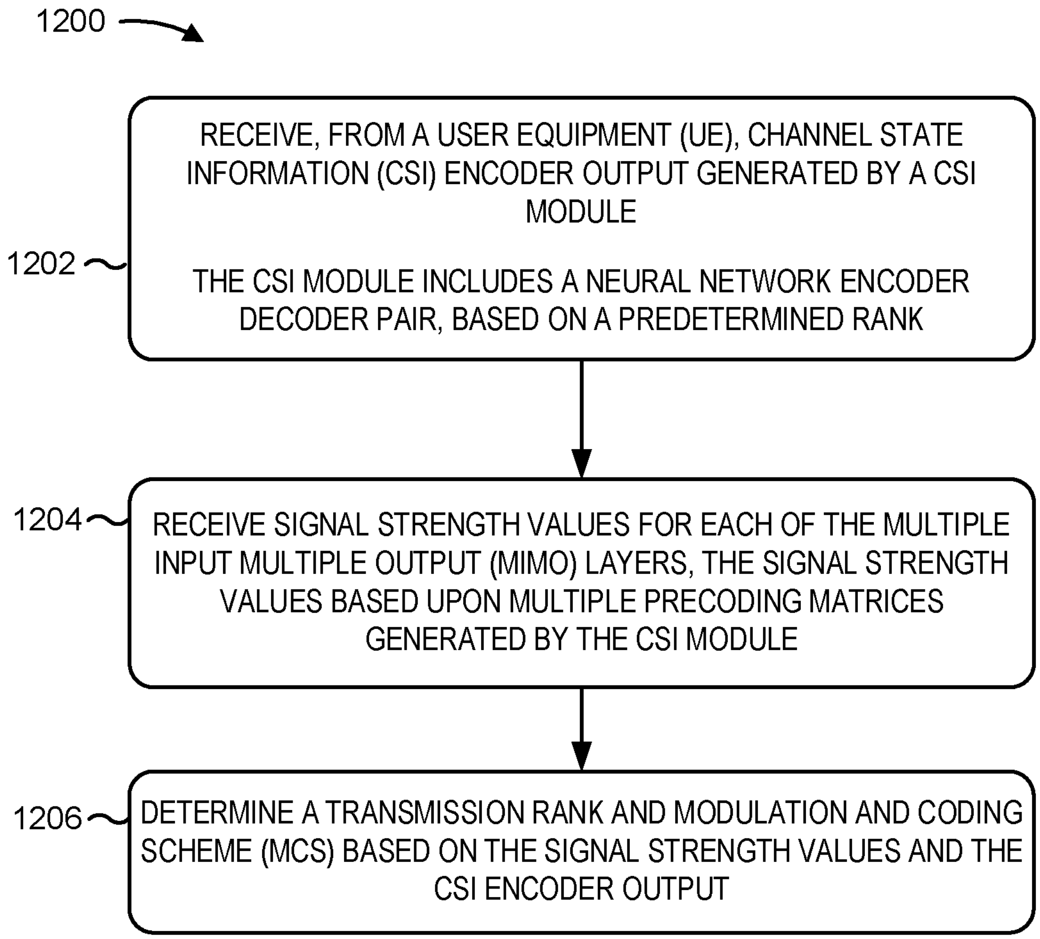
FIG. 12 is a flow diagram illustrating an example process performed, for example, by a base station, in accordance with various aspects of the present disclosure.

FIG. 12 is a flow diagram illustrating an example process 1200 performed, for example, by a base station, in accordance with various aspects of the present disclosure. The example process 1200 is an example of channel state information (CSI) reporting for machine learning (ML)-based precoding feedback. The operations of the process 1200 may be implemented by a base station 110.

At block 1202, the base station receives, from a user equipment (UE), channel state information (CSI) encoder output generated by a CSI module including a neural network encoder decoder pair, based on a predetermined rank. For example, the base station (e.g. using the antenna 234, MOD/DEMOD 232, MIMO detector 236, receive processor 238, controller/processor 240, and/or memory 242) may receive the CSI encoder output based on the predetermined rank. The predetermined rank may be a maximum rank. In some aspects, the maximum rank is configured by the base station. In other aspects, the maximum rank is a minimum of a number of antenna ports at the UE and a number of antenna ports at the base station.

At block 1204, the base station receives signal strength values for each of a multiple of multiple input multiple output (MIMO) layers, the signal strength values based upon a multiple of precoding matrices generated by the CSI module. For example, the base station (e.g. using the antenna 234, MOD/DEMOD 232, MIMO detector 236, receive processor 238, controller/processor 240, and/or memory 242) may receive the signal strength values. The signal strength values may be signal to interference plus noise ratio (SINR) values.

At block 1206, the base station determines a transmission rank and modulation and coding scheme (MCS) based on the signal strength values and the CSI encoder output. For example, the base station (e.g. using the controller/processor 240, and/or memory 242) may determine the transmission rank and MCS.

Example Aspects

Aspect 1: A method of wireless communication by a user equipment (UE), comprising: estimating a downlink channel to generate a channel estimate; obtaining a plurality of precoding matrices, by a channel state information (CSI) module including a neural network encoder decoder pair, based on the channel estimate and a plurality of different multiple input multiple output (MIMO) ranks; determining a best rank indicator based on the plurality of precoding matrices and spectral efficiency estimates for the plurality of different MIMO ranks; and reporting, to a base station, the best rank indicator, a channel quality index (CQI), and CSI encoder output.

Aspect 2: The method of Aspect 1, in which the CSI module comprises a plurality of CSI modules, each of the plurality of CSI modules corresponding to a different MIMO rank.

Aspect 3: The method of Aspect 1, in which the CSI module receives a plurality of potential rank indicators as input.

Aspect 4: The method of any of the preceding Aspects, further comprising receiving, from the base station, signaling of CSI decoder information of the neural network encoder decoder pair.

Aspect 5: The method of any of the preceding Aspects, further comprising calculating the CQI based on the best rank indicator and the plurality of precoding matrices.

Aspect 6: The method of any of the preceding Aspects, in which the channel estimate models physical propagation characteristics of the downlink channel between the base station and the UE.

Aspect 7: A method of wireless communication by a base station, comprising: receiving, from a user equipment (UE), channel state information (CSI) encoder output generated by a CSI module including a neural network encoder decoder pair, based on a predetermined rank; receiving signal strength values for each of a plurality of multiple input multiple output (MIMO) layers, the signal strength values based upon a plurality of precoding matrices generated by the CSI module; and determining a transmission rank and modulation and coding scheme (MCS) based on the signal strength values and the CSI encoder output.

Aspect 8: The method of Aspect 7, in which the predetermined rank is a maximum rank.

Aspect 9: The method of Aspect 7 or 8, in which the maximum rank is configured by the base station.

Aspect 10: The method of any of Aspects 7 or 8, in which the maximum rank is a minimum of: a quantity of antenna ports at the UE and a quantity of antenna ports at the base station.

Aspect 11: The method of any of the Aspects 7-10, in which the signal strength values comprise signal to interference plus noise ratio (SINR) values.

Aspect 12: An apparatus for wireless communication by a user equipment (UE), comprising: a memory; and at least one processor coupled to the memory, the at least one processor configured: to estimate a downlink channel to generate a channel estimate; to obtain a plurality of precoding matrices, by a channel state information (CSI) module including a neural network encoder decoder pair, based on the channel estimate and a plurality of different multiple input multiple output (MIMO) ranks; to determine a best rank indicator based on the plurality of precoding matrices and spectral efficiency estimates for the plurality of different MIMO ranks; and to report, to a base station, the best rank indicator, a channel quality index (CQI), and CSI encoder output.

Aspect 13: The apparatus of Aspect 12, in which the CSI module comprises a plurality of CSI modules, each of the plurality of CSI modules corresponding to a different MIMO rank.

Aspect 14: The apparatus of Aspect 12, in which the CSI module receives a plurality of potential rank indicators as input.

Aspect 15: The apparatus of any of the Aspects 12-14, in which the at least one processor is further configured to receive, from the base station, signaling of CSI decoder information of the neural network encoder decoder pair.

Aspect 16: The apparatus of any of the Aspects 12-15, in which the at least one processor is further configured to calculate the CQI based on the best rank indicator and the plurality of precoding matrices.

Aspect 17: The apparatus of any of the Aspects 12-16, in which the channel estimate models physical propagation characteristics of the downlink channel between the base station and the UE.

Aspect 18: An apparatus for wireless communication by a base station, comprising: a memory; and at least one processor coupled to the memory, the at least one processor configured: to receive, from a user equipment (UE), channel state information (CSI) encoder output generated by a CSI module including a neural network encoder decoder pair, based on a predetermined rank; to receive signal strength values for each of a plurality of multiple input multiple output (MIMO) layers, the signal strength values based upon a plurality of precoding matrices generated by the CSI module; and to determine a transmission rank and modulation and coding scheme (MCS) based on the signal strength values and the CSI encoder output.

Aspect 19: The apparatus of Aspect 18, in which the predetermined rank is a maximum rank.

Aspect 20: The apparatus of Aspect 18 or 19, in which the maximum rank is configured by the base station.

Aspect 21: The apparatus of any of the Aspect 18 or 19, in which the maximum rank is a minimum of: a quantity of antenna ports at the UE and a quantity of antenna ports at the base station.

Aspect 22: The apparatus of any of the Aspects 18-21, in which the signal strength values comprise signal to interference plus noise ratio (SINR) values.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:

estimating a downlink channel to generate a channel estimate;

receiving, from a base station, signaling of CSI decoder information of a neural network encoder decoder pair;

obtaining a plurality of precoding matrices, by a channel state information (CSI) module including a CSI encoder of the neural network encoder decoder pair, the CSI encoder operating at the UE, based on the channel estimate and a plurality of different multiple input multiple output (MIMO) ranks;

determining a best rank indicator based on the plurality of precoding matrices and spectral efficiency estimates for the plurality of different MIMO ranks; and reporting, to the base station, the best rank indicator, a channel quality index (CQI), and CSI encoder output comprising a value obtained in accordance with the channel estimate, the CSI decoder information, and the best rank indicator.

2. The method of claim 1, in which the CSI module comprises a plurality of CSI modules, each of the plurality of CSI modules corresponding to a different MIMO rank.

3. The method of claim 1, in which the CSI module receives a plurality of potential rank indicators as input.

4. The method of claim 1, further comprising predicting, based on the channel estimate and the CSI decoder information, CSI decoder outputs corresponding to the plurality of different MIMO ranks.

5. The method of claim 1, further comprising calculating the CQI based on the best rank indicator and the plurality of precoding matrices.

6. The method of claim 1, in which the channel estimate models physical propagation characteristics of the downlink channel between the base station and the UE.

7. The method of claim 1, in which the value comprises a quantized value.

8. An apparatus for wireless communication by a user equipment (UE), comprising:

at least one memory; and at least one processor coupled to the at least one memory, the at least one processor configured:

to estimate a downlink channel to generate a channel estimate;

to receive, from a base station, signaling of CSI decoder information of a neural network encoder decoder pair;

to obtain a plurality of precoding matrices, by a channel state information (CSI) module including a CSI encoder of the neural network encoder decoder pair, the CSI encoder operating at the UE, based on the channel estimate and a plurality of different multiple input multiple output (MIMO) ranks;

to determine a best rank indicator based on the plurality of precoding matrices and spectral efficiency estimates for the plurality of different MIMO ranks; and to report, to the base station, the best rank indicator, a channel quality index (CQI), and CSI encoder output comprising a value obtained in accordance with the channel estimate, the CSI decoder information, and the best rank indicator.

9. The apparatus of claim 8, in which the CSI module comprises a plurality of CSI modules, each of the plurality of CSI modules corresponding to a different MIMO rank.

10. The apparatus of claim 8, in which the CSI module receives a plurality of potential rank indicators as input.

11. The apparatus of claim 8, in which the at least one processor is further configured to predict, based on the channel estimate and the CSI decoder information, CSI decoder outputs corresponding to the plurality of different MIMO ranks.

12. The apparatus of claim 8, in which the at least one processor is further configured to calculate the CQI based on the best rank indicator and the plurality of precoding matrices.

13. The apparatus of claim 8, in which the channel estimate models physical propagation characteristics of the downlink channel between the base station and the UE.

14. The apparatus of claim 8, in which the value comprises a quantized value.

15. An apparatus for wireless communication at a user equipment (UE), comprising:

means for estimating a downlink channel to generate a channel estimate;

means for receiving, from a base station, signaling of CSI decoder information of a neural network encoder decoder pair;

means for obtaining a plurality of precoding matrices, by a channel state information (CSI) module including a CSI encoder of the neural network encoder decoder pair, the CSI encoder operating at the UE, based on the channel estimate and a plurality of different multiple input multiple output (MIMO) ranks;

means for determining a best rank indicator based on the plurality of precoding matrices and spectral efficiency estimates for the plurality of different MIMO ranks; and means for reporting, to the base station, the best rank indicator, a channel quality index (CQI), and CSI encoder output comprising a value obtained in accordance with the channel estimate, the CSI decoder information, and the best rank indicator.

16. The apparatus of claim 15, in which the CSI module comprises a plurality of CSI modules, each of the plurality of CSI modules corresponding to a different MIMO rank.

17. The apparatus of claim 15, in which the CSI module receives a plurality of potential rank indicators as input.

18. The apparatus of claim 15, further comprising means for predicting, based on the channel estimate and the CSI decoder information, CSI decoder outputs corresponding to the plurality of different MIMO ranks.

19. The apparatus of claim 15, further comprising means for calculating the CQI based on the best rank indicator and the plurality of precoding matrices.

20. A non-transitory computer-readable medium storing computer-executable instructions that, when executed by a processor of a user equipment (UE), cause the processor to:

estimate a downlink channel to generate a channel estimate;

receive, from a base station, signaling of CSI decoder information of a neural network encoder decoder pair;

obtain a plurality of precoding matrices, by a channel state information (CSI) module including a CSI encoder of the neural network encoder decoder pair, the CSI encoder operating at the UE, based on the channel estimate and a plurality of different multiple input multiple output (MIMO) ranks;

determine a best rank indicator based on the plurality of precoding matrices and spectral efficiency estimates for the plurality of different MIMO ranks; and report, to the base station, the best rank indicator, a channel quality index (CQI), and CSI encoder output comprising a value obtained in accordance with the channel estimate, the CSI decoder information, and the best rank indicator.

21. The non-transitory computer-readable medium of claim 20, in which the CSI module comprises a plurality of CSI modules, each of the plurality of CSI modules corresponding to a different MIMO rank.

22. The non-transitory computer-readable medium of claim 20, in which the CSI module receives a plurality of potential rank indicators as input.

23. The non-transitory computer-readable medium of claim 20, in which the instructions further cause the processor to predict, based on the channel estimate and the CSI decoder information, CSI decoder outputs corresponding to the plurality of different MIMO ranks.

24. The non-transitory computer-readable medium of claim 20, wherein the instructions further cause the processor to calculate the CQI based on the best rank indicator and the plurality of precoding matrices.

* * * * *